May 24, 1927.
F. B. MASON
1,630,067
OIL TESTING APPARATUS FOR MOTOR VEHICLES
Filed March 26, 1926
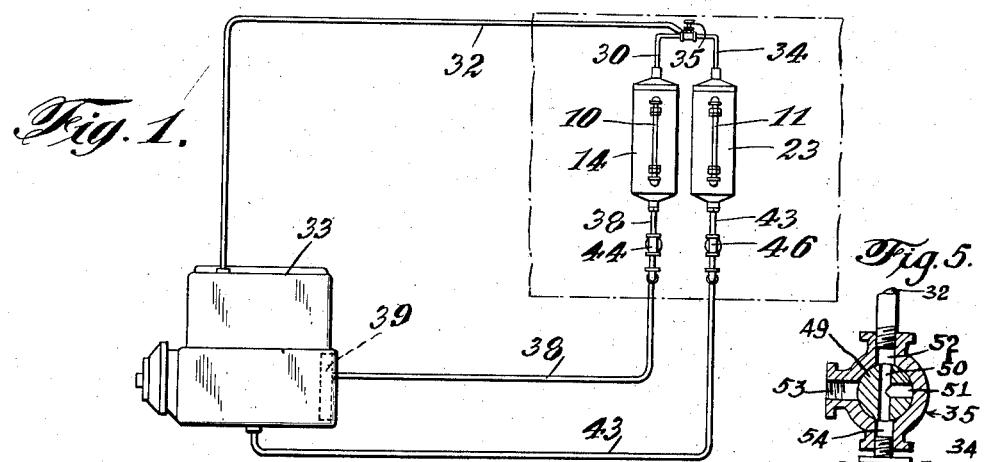
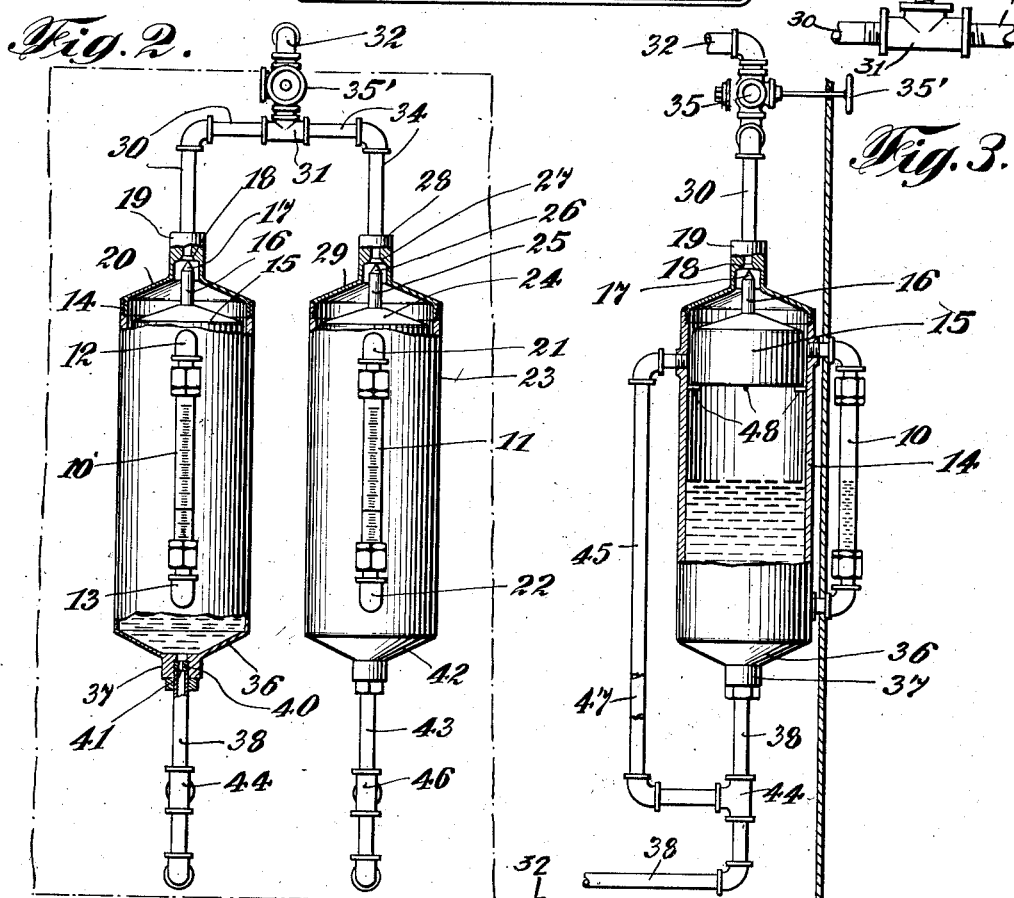
INVENTOR
Frank B. Mason
BY
ATTORNEYS Patented May 24, 1927.

1,630,067

UNITED STATES PATENT OFFICE.

FRANK B. MASON, OF NEW PROVIDENCE, NEW JERSEY, ASSIGNOR OF ONE-FOURTH TO FRANK A. URNER, OF SCOTCH PLAINS, NEW JERSEY; ONE-FOURTH TO ELMER A. FORD, OF WESTFIELD, NEW JERSEY; AND ONE-FOURTH TO ARTHUR H. SERRELL, OF NEW YORK, N. Y.

OIL-TESTING APPARATUS FOR MOTOR VEHICLES.

Application filed March 26, 1926. Serial No. 97,503.

In order to properly lubricate the motor of a vehicle, it is generally understood that the oil should be changed, that is renewed at certain intervals depending upon various circumstances, the nature of the oil, the type of motor, weather conditions, and the distance traveled being the most important factors in determining upon the advisability of renewing the oil used for lubricating the motor.
Many, if not the majority of drivers of motor vehicles, merely follow more or less blindly certain rules laid down for changing the oil. This naturally results in either a waste of the oil by changing the same before it is necessary or in using the oil for too long a period and thereby causing injury to the motor. The object of my present invention is the provision of an apparatus which may be attached directly to a motor vehicle and visible to the driver, being so placed as to be seen from the driver's seat and also to be operated therefrom, to enable the driver with sufficient certainty to determine upon the time when the lubricating oil should be changed. In carrying out the invention I employ a plurality of receptacles with indicating or gage glasses attached thereto and visible to the driver, preferably on the dash board, together with means for comparing the oil in the crank case with a standard oil to determine whether or not the crank case oil should be changed.

The apparatus will be hereinafter more particularly described in conjunction with the accompanying drawings, in which Figure 1 is a diagrammatic elevation illustrating the apparatus comprising my invention.

Fig. 2 is a front elevation and partial cross section.
Fig. 3 is an elevation and partial cross section through one of the receptacles taken at right angles to the position as shown in Fig. 2.

Fig. 4 is a section illustrating a form of valve employed in the apparatus, and Fig. 5 is a similar view showing the valve in another position.

In carrying out the invention the apparatus comprises suitably graduated gage glasses indicated at 10 and 11 which are so placed on or in recesses within the dash board of a motor vehicle as to be in sight of the driver. The gage glass 10 is connected by suitable pipes 12 and 13 to a receptacle or vessel 14. The pipes 12 and 13 preferably pass through apertures provided therefor in the dash board and the vessel 14 is suitably supported at the rear of the dash board. In this receptacle 14 there is a float 15 carrying a stem 16 terminating in a tapered end 17 which acts as a valve and is adapted to bear against a valve seat 18 provided for this purpose in the top 19 of a cover 20 for the receptacle 14.

Similarly the gage glass 11 is connected by pipes 21 and 22, which extend through the dash board, with a receptacle 23 suitably supported under or at the rear of the dash board. Within this receptacle 23 there is a float 24 carrying a stem 25 which at its extremity is tapered as indicated at 26 and adapted to bear against a valve seat 27 provided therefor in the top or cap 28 of a cover 29 for the vessel or receptacle 23.

The top 19 of the cover 20 is connected by a pipe 30 to a T 31 leading from which is a pipe 32 which is connected to the cylinder spaces of a motor 33. The top 28 of the cover 29 is connected by a pipe 34 to the T 31 and in the pipe line 32 there is a valve 35 operated through the valve stem and wheel 35' at the outer side of the dash board or otherwise.

At the lower end thereof the receptacle 14 is provided with a bottom 36 terminating in a cap 37 to which a pipe 38 extends to a receptacle 39 of any suitable nature attached to or made integral with the motor casing, but which as will be understood is separate and distinct from the gear case in which the lubricating oil is contained. This receptacle 39 is adapted to receive and hold a sample of oil or lubricant used for comparison as hereinafter more fully explained. Within the cap 37 there is a bushing 40 having a standardized bore 41 therethrough by means of which the oil or other lubricant is caused to flow to and away from the receptacle 14. In a similar manner the receptacle 23 is provided with a bottom 42 constructed in the same manner as the bottom member of the receptacle 14. From the bottom 42 of the receptacle 23 a pipe 43 extends and is connected in any suitable manner to the gear casing in which the lubricating oil of the motor is contained.

In the pipe 38 there is preferably provided a T 44 for the purpose of employing a by-pass or overflow pipe 45 making communication between the upper portion of the vessel 14 and the pipe 38. In a similar manner the pipe 43 is also fitted with a T 46 to make provision for the use of a by-pass or overflow pipe 47, making communication between the upper portion of the receptacle 23 and the pipe 43.

The valve 35 may be any ordinary form of three way valve and may be constructed as shown particularly in Figs. 4 and 5. In this construction the valve includes a casing and a revoluble plug 49 mounted therein and suitably provided with a stem fitted with the handle 35'. In the plug 49 there is a transverse passage 50 and a lateral passage 51. The valve casing is made to include a chamber 52 in a connection to which the pipe 32 is attached, a chamber 53 normally open to the atmosphere and a chamber 54 in a position diametrically opposite to the chamber 52, the chamber 54 being in a connection of the valve casing to which the T 31 and the pipes 30 and 34 are attached. When in the position shown in Fig. 4 the interior of the receptacles 14 and 23 are open to the atmosphere by way of the pipes 30 and 34 and the passage of the valve stem to the atmosphere by way of the chamber 53, and when the valve is in the position shown in Fig. 5 the outlet to the atmosphere is closed and the interior of the receptacles 14 and 23 is in communication with the pipe 32 and thereby with the cylinders of the motor.

In the use of this apparatus the receptacles 14 and 23 are normally empty and the floats therein maintained in positions adjacent the upper ends of the receptacles by means of stops 48 as illustrated in Fig. 3 or otherwise. Normally the valve 35 is in the position shown in Fig. 4 in which the interior of the receptacles is in communication with the atmosphere. A suitable sample of lubricating oil is also maintained in the receptacle 39. Now when it is desired to test the oil in the crank case or make a comparison between the same and the standard sample, the operator shifts the valve 35 to the position shown in Fig. 5 and due to the vacuum in the cylinder spaces in the motor, it being understood that the motor is running, the vacuum will draw the oil from the receptacle 39 through the pipe 38 into the receptacle 14 until the same is filled when the float will rise and the valve bear against the valve seat 18, thereby preventing the flow of further oil into the receptacle. In the same manner oil in the crank case will pass by way of the pipe 43 to the receptacle 23 until the same is filled and the flow shut off by the float rising and the valve seating against the valve seat 27. With both receptacles filled the valve 35 is returned to its normal position, admitting atmospheric pressure to the receptacles whereupon the oils therein will return to their original places, that is the oil from the receptacle 14 to the receptacle 39 and the oil from the receptacle 23 to the crank case. The comparative rates at which these oils flow from the receptacles is visible in the gage glasses 10 and 11 and the gages may be so graduated as to enable the operator by observing the return flow of the oil to determine whether or not the oil in the crank case should be changed. It will be understood that it is expedient to have the receptacle 39 associated with the motor casing in order that the sample oil or other material contained in this receptacle may be maintained at substantially the same temperature as the oil in the crank case. It will also be understood that it will be necessary to provide a suitable vent for this receptacle 39, and in some instances for the crank case in order to obviate any back pressure tending to retard the return flow of the oil or other liquids from the receptacles 14 and 23. In some instances, also, it may be necessary to stop the motor while the comparison of the oils is being made.

I claim as my invention:

1. In an apparatus of the class described, a receptacle, a container for a standard liquid, a connection establishing communication between the said receptacle and container, a second receptacle, a second container for holding a liquid to be compared with the standard liquid, a connection establishing communication between the said second receptacle and second container, means for drawing liquids from the said containers into the said receptacles until the receptacles are filled, and means for observing the comparative rates at which said liquids flow from the said receptacles.

2. In an apparatus of the class described, a receptacle, a container for holding a standard liquid, a connection establishing communication between the said container and receptacle, a second receptacle, a second container for holding a liquid to be compared with the standard liquid, a connection establishing communication between the said second container and second receptacle, means for drawing the said liquids into the said receptacles, means for automatically stopping the flow of the liquid to the receptacles when the same are filled, and means for observing the comparative rates at which said liquids flow from said receptacles.

3. In an apparatus of the class described, a receptacle, a container for a sample oil to be used as a standard, a connection establishing communication between the said container and receptacle, a second receptacle, a second container for holding an oil to be compared with the said standard sample, a connection establishing communication between the said second container and second receptacle, means for drawing the oils from the said containers into the receptacles until the receptacles are filled, and means for observing the comparative rates at which the said oils flow from the said receptacles.

4. In an apparatus of the class described, a receptacle, a container for a sample oil to be used as a standard, a connection establishing communication between the said container and receptacle, a second receptacle, a second container for holding an oil to be compared with the standard sample, a connection establishing communication between the said second container and second receptacle, means for drawing oils from the said containers into the receptacles, a float in each of the said receptacles, a valve in each receptacle operated by the float therein for stopping the flow of the oil when the receptacles are filled, and means for observing the comparative rates at which the oils flow from the said receptacles.

5. In an apparatus of the class described, a motor having a crank case and a container for a sample oil to be used as a standard, a receptacle, a pipe line adapted to make communication between the said receptacle and the container in the motor casing for the sample to be used as a standard, a second receptacle, a pipe line adapted to make communication between the second receptacle and the said crank case, a pipe line making communication between the said receptacles and the said motor casing for creating a vacuum in the receptacles for drawing the oil from the said container to the first receptacle and from the crank case to the second receptacle, means for stopping the flow of the oil into the receptacles when the receptacles are filled, and means for observing the comparative rates at which the oils flow from the receptacles to the said container and crank case.

6. In an apparatus of the class described, a motor having a crank case and a container for a sample oil to be used as a standard, a receptacle, a pipe line adapted to make communication between the said receptacle and the container in the motor casing for the sample to be used as a standard, a second receptacle, a pipe line adapted to make communication between the second receptacle and the said crank case, a pipe line making communication between the said receptacles and the said motor casing for creating a vacuum in the receptacles for drawing the oil from the said container to the first receptacle and from the crank case to the second receptacle, means for stopping the flow of the oil into the receptacles when the receptacles are filled, and a gauge glass associated with each receptacle for observing the comparative rates at which the oils flow from the said receptacles.

7. In an apparatus of the class described, a set of receptacles, a corresponding number of liquid containers, means establishing communication for transferring a liquid from each container to a corresponding receptacle until the receptacle is filled and permitting the liquids to then drain from the said receptacles, and means for observing the comparative rates at which the liquids drain from the said receptacles.

8. In an apparatus of the class described, a set of receptacles, a set of containers adapted to hold liquids, means establishing communication for simultaneously transferring the liquids from each container to a corresponding receptacle until the receptacles are filled, and means for observing the comparative rates at which the liquids drain from the several receptacles.

9. In an apparatus of the class described, a receptacle, a container for a standard liquid, means establishing communication whereby the standard liquid may flow from the said container to the said receptacle and drain from the said receptacle, a second receptacle, a container for holding a liquid to be compared with the standard liquid, and means establishing communication whereby the liquid to be compared with the standard liquid may flow from the said second container to the second receptacle and drain from the said second receptacle.

10. In an apparatus of the class described, a receptacle, a container for a standard liquid, means establishing communication whereby the standard liquid may flow from the said container to the said receptacle and drain from the said receptacle, a second receptacle, a container for holding a liquid to be compared with the standard liquid, means establishing communication whereby the liquid to be compared with the standard liquid may flow from the said second container to the second receptacle and drain from the said second receptacle, and means for observing the comparative rates of flow of the said liquids as the same drain from the said receptacles.

Signed by me this 3rd day of March, 1926.

FRANK B. MASON.